UNITED STATES PATENT OFFICE.

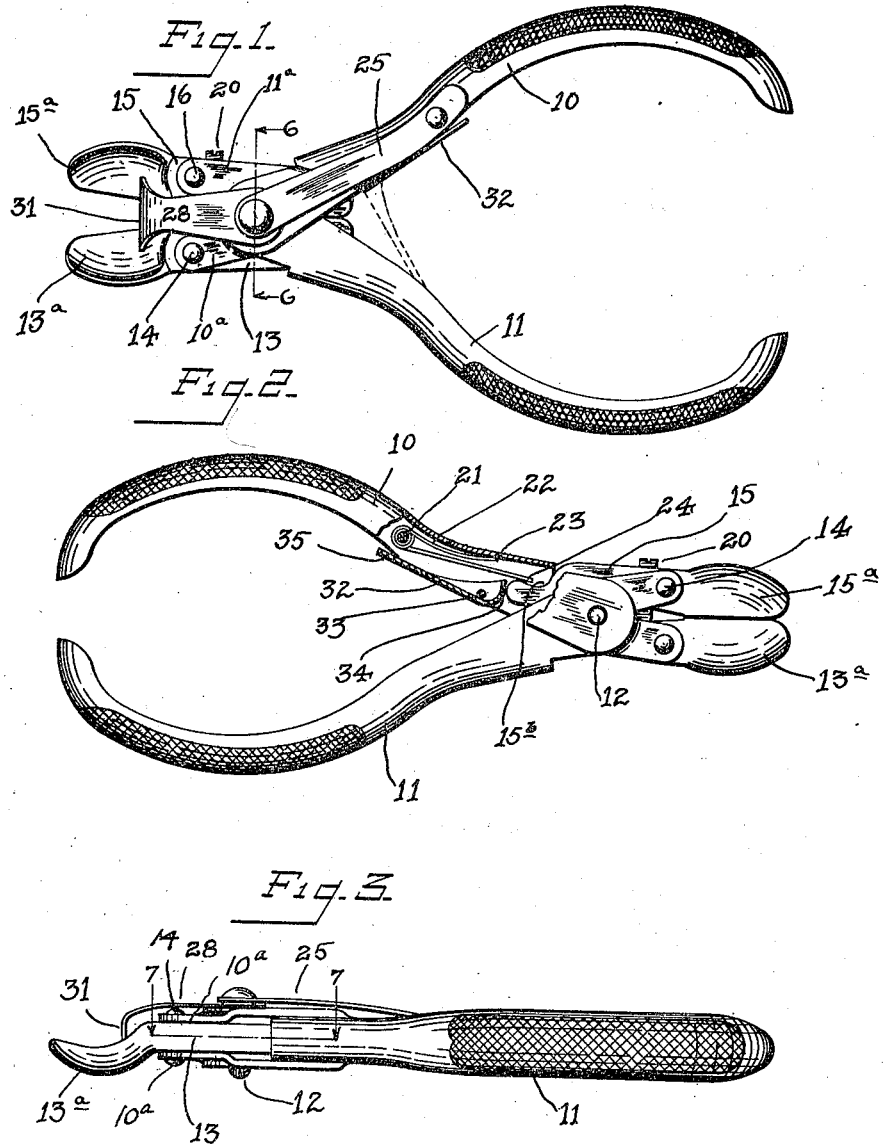

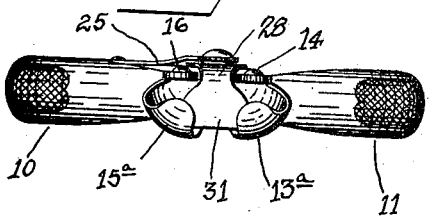
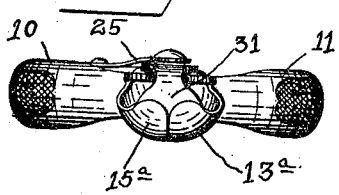
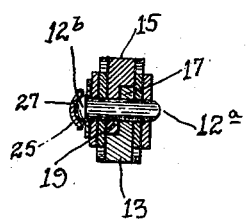
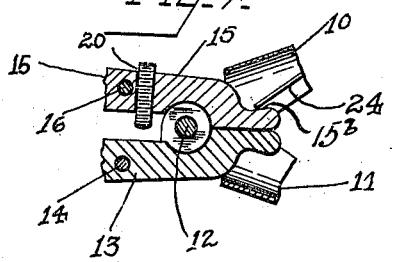
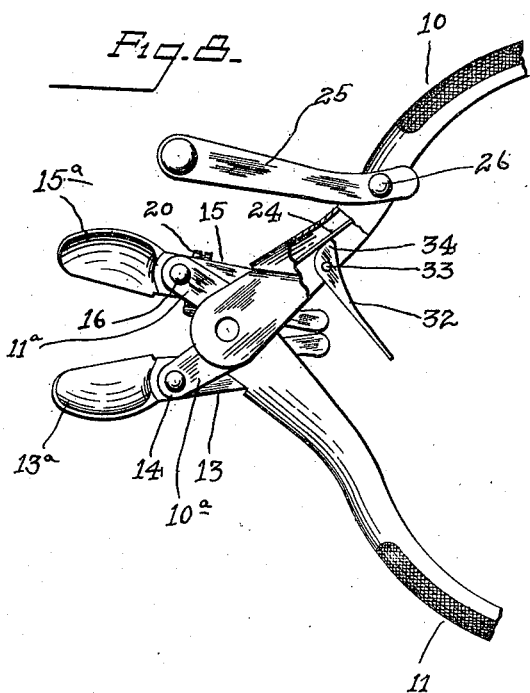
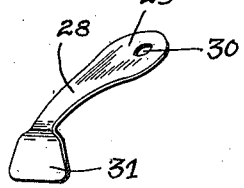

WILLIAM A. BERNARD, OF NEW HAVEN, CONNECTICUT, ASSIGNOR TO THE WILLIAM SCHOLLHORN COMPANY, OF NEW HAVEN, CONNECTICUT, A CORPORATION OF CONNECTICUT.

HAND-TOOL.

1,300,330.

Specification of Letters Patent.  Patented Apr. 15, 1919.

Application filed October 31, 1916.  Serial No. 128,720.

*To all whom it may concern:*

Be it known that I, WILLIAM A. BERNARD, a citizen of the United States, residing in New Haven, county of New Haven, State of Connecticut, have invented certain new and useful Improvements in Hand-Tools, of which the following is a full, clear, and exact description.

This invention relates to a hand tool of the plier or lever handle type, and it has particular reference to a fruit clipper especially adapted for orange pickers.

The general object in view is the provision of a simple, convenient and efficient tool for clipping the orange or other stem close to the fruit, so that the fruit can be packed without any stem projections, although it will be understood that certain features of my improvements will be found useful in tools used for other purposes.

More specifically, my invention has for its object the provision of a tool of the plier or lever handle type having pivoted cutting jaws, which can be readily separated when desired, in order to facilitate sharpening. It is also aimed to provide a tool of this character which, in spite of the fact that the blades can be opened up or separated for sharpening, has no threaded bolts and nuts to work loose, and which is of very simple and compact construction.

Another object of the invention is to provide means for taking the tension off of the spring which normally separates the cutting jaws, in order to facilitate the separation of the jaws for sharpening.

Still another object of the invention is to furnish an improved form of stop for insuring the cutting of the orange stem or the like at the proper point relatively to the length of the cutting jaws.

To these and other ends, the invention consists in the novel features and combinations of parts to be hereinafter described and claimed.

In the accompanying drawings,

Figure 1 is a side elevation of a fruit clipper embodying my improvements, showing the jaws in the open position;

Fig. 2 is a view from the opposite side, showing the jaws closed, certain parts being broken away;

Fig. 3 is an edge view of the tool;

Fig. 4 is a front end view, with the jaws open;

Fig. 5 is a front end view, with the jaws closed;

Fig. 6 is a section on line 6—6 of Fig. 1;

Fig. 7 is a section on line 7—7 of Fig. 3.

Fig. 8 is a side elevation, showing the jaws separated for sharpening the cutter blades;

Fig. 9 is a detail of the stop for limiting the movement of the cutting blades relatively to the fruit stem; and Fig. 9A is a detail of the main pivot pin.

In my improved tool, the jaws are mounted relatively to the lever handles in substantially the same manner shown in my Patent No. 1,057,113, dated March 25, 1913. The lever handles 10, 11 are preferably constructed of sheet metal, and they have forked forward portions which cross each other, and are pivoted together by means of a pivot pin 12 (Fig. 2). The pivot is located intermediate the ends of the crossed handle members, each of which is provided in advance of the pivot with forwardly extending parallel portions 10$^a$, 11$^a$ respectively forming the sides or branches of the forks. Between the parallel portions 10$^a$, a jaw 13 is secured by means of a fastening pin 14 and a similar jaw is secured between the parallel portions 11$^a$ by a fastening pin 16. The pins 14, 16 respectively are both located in advance of the main pivot pin 12, and are preferably arranged at the forward extremities of the respective handle members, beyond which extremities the jaws 13, 15, extend forwardly. The butt ends of the jaws 13, 15 extend rearwardly beyond the pivot 12 to a considerable extent, and each of the jaws is pivoted on the pivot pin 12 which forms the axis about which the jaws are adapted to swing toward and away from each other. At the pivotal portion of the jaw 13, the latter is provided with a perforated lug 17 of less width than the body portion of the jaw, and the body portion is recessed adjacent said lug in order to accommodate a perforated lug 19 on the jaw 15, corresponding in shape to the lug 17. The lug 17 is similarly received in a cut away portion of the jaw 15, and the pivot pin 12 is passed through the crossed forked portions of the handles, and through the registering perforated lugs 17, 19, thereby pivoting the jaws to each other in a strong and substantial manner by what I term a double box joint.

It will be understood that each of the jaws 13, 15 is rigidly attached to one of the lever handles at two separate points in the length of the jaw. The jaws are secured to the respective lever handles by the fasteners 14, 16 in advance of the pivot 12, and said pivot 12 connects each jaw at another point to the same lever handle to which it is secured in advance of the pivot; and at the same time the pivot member 12 serves to pivot together the composite crossed lever members formed by the jaws and handles.

The portions of the respective jaws 13, 15 located at the rear of the main pivot are adapted to make contact with each other when the forward ends of the jaws are separated from each other, as shown in Fig. 7. The forward ends of the jaws are provided with cup shaped cutters or nippers 13ª, 15ª adapted to close edge-to-edge when the handles 10, 11 are moved toward each other. The cutters are so shaped as to form a sort of bowl so that the stem of an orange or the like can be so cut off as to leave no projection. In order to prevent dulling of the blade by the edge-to-edge contact, I use a stop screw 20 in connection with one of the jaws, for example, the jaw 15, said screw being passed through a threaded opening in the jaw, and having its inner end adapted to make contact with the other jaw when the cutting edges are sufficiently close to each other. This adjusting screw 20 is located slightly in advance of the main pivot, as shown in Fig. 7, and it will be understood that the opening movement of the jaws is limited by the stop surfaces at the rear of the pivot, whereas the closing movement of the jaws is limited by the adjusting screw.

The cutting edges are normally separated from each other by suitable spring mechanism. In the form shown, a pin 21 traverses the U-shaped handle 10 somewhat at the rear of the main pivot, and a wire spring 22 is coiled about the pin 21 with one end 23 bearing against the inner surface of the handle, and the other end 24 bearing on the rear extremity of the jaw 15 within a recess or seat 15ᵇ formed in said jaw. The jaw 15 being rigid with the other handle member 11, through the connections 12, 14, the spring 22 tends to hold the handles, and thereby the jaws, separate from each other, owing to the tendency of the spring terminals 23, 24 to move away from each other, one acting directly on one handle, and the other acting on the other handle through its connecting jaw. When the handles are closed, as shown in Fig. 2, the spring is put under tension; as soon as the handles are released, the handles and jaws spring to the open position, shown in Fig. 1.

In order to make the cutting jaws readily separable from each other for sharpening, the pivot pin 12 is made detachable from the jaws and handles. In the particular form shown, the pivot pin has a perfectly smooth shank with a rounded extremity 12ª and an enlarged rounded head 12ᵇ, and it is detachably held in place by a swinging clip 25 preferably made of springy sheet metal. This clip is pivoted on one of the lever handles, for example, the handle 10, by a pivot pin 26, located near one end of the clip, and at the opposite end, the under surface of the clip or retainer, is provided with a dished portion or pocket 27 adapted to conform to the head 12ᵇ of the pivot pin to hold said pin in place. When the tool is in the operative position, the clip or retainer 25 is snugly held parallel with and against the lever member 10 by its springy nature, and the spring action of the clip holds the pivot pin firmly in place. However, when it is desired to remove the pivot pin, the clip 25 can be lifted slightly, and then swung laterally on its pivot 26 to a position in which it disengages the pivot pin, whereupon the latter may be readily pushed or pulled out of place to permit the separation of the jaws.

In order to cause the cutting action of the blades 13ª, 15ª to take place at the proper point longitudinally of the cutting edges, I use a stop member 28, shown in detail in Fig. 9. This stop member is preferably formed of sheet metal, and it is held in place by the pivot pin 12. At one end, it has a lug 29, with a perforation 30, engaged by the pivot pin immediately beneath the head of said pin. This stop member 28 extends forwardly from the pivot pin, and at its forward end it has an inturned flat stop member 31 extending substantially at right angles to the longitudinal axis of the tool, and engaging what may be termed the upper surfaces of the cutting blades, which are of concave form, the under surfaces of said blades being of convex form. The head of the pin 12 holds the stop member 28 in place, and the spring clip 25 in turn holds the pivot pin in place and maintains the under surface of the pivot pin head in firm contact with the outer surface of the stop member around the perforation 30. Owing to the fact that the stop member 28 is made of spring metal it can be caused to maintain contact with the respective cutting blades at all times. It is so formed and arranged that it contacts with the cutters when the jaws are open, as shown in Fig. 1, and when the jaws are closed, it yields, while the concave surfaces of the cutters approach each other and press against the edge of the stop member 31. As the cutters are again separated, the stop portion 31 of the stop member follows them downwardly and inwardly with respect to the bowl, so as to maintain its contact with said cutters.

In order to take the tension off the spring 22, and thereby facilitate the removal of the pivot pin 12, I provide a pivoted lever member 32 in association with the same lever handle in which the spring is mounted. In the form shown, a sheet metal lever 32 is pivoted intermediate of its ends by a pin 33 between the side walls of the handle member 10, and it has a nose portion 34 to engage the extremity 24 of the spring. At the opposite end, the lever has a manipulating portion 35 located at the inner part of the handle where it can be readily reached, and when the lever is shifted from the position shown in Fig. 2, to that shown in Fig. 8, the nose 34 acts in the nature of a cam which shifts the spring away from the rear extremity of the jaw 15 and holds it away from said jaw.

In using the implement for gathering oranges, for example, the tool, while the jaws are held in the open position, has its cutters thrust over the fruit stem until the inturned portion of the stop 28 abuts the stem. The handles are then closed together, and the stem is nipped off by the cutting edges, the closing movement of which can be limited as desired, by the screw 20. The tool is very convenient to operate, and it has no objectionable projecting parts. Owing to the rigidity of the jaws and handles, a very powerful nipping action can be exerted on the fruit stem and yet the tool can be cheaply made.

When it is desired to sharpen the cutting blades, the jaws are separated in the manner shown in Fig. 8. The lever 32 is shifted to a position in which it takes the tension off the jaw-opening spring. The clip 25 is then shifted laterally away from the pivot pin 12. The pivot pin can then be readily pushed or pulled out of place, because there is absolutely no binding action thereon owing to the fact that the spring has been rendered inoperative. When the pivot pin has been removed, the jaws are no longer held together in such close relation, and they may be separated to about the extent shown in Fig. 8. This gives ample access to the cutting blades for honing them, and after honing, the implement can be restored to the operative condition in an obvious manner.

The stop member 28 is removed when the pivot pin is taken out. On reassembling, it is placed with its perforation 30 in register with the registering perforations of the handles and jaws, and the pivot pin then inserted to hold it in place, after which the clip 25 is swung over to press the pin home and retain it in position by holding its head in engagement with one side face of the tool. The spring 22 is then restored to the operative condition by swinging the lever or cam member 32 back to the initial position in which it is substantially concealed within the lines of one of the lever handles.

Various changes in the details of the construction may be made without departing from the scope of the invention as defined in the claims.

What I claim is:

1. In a fruit clipper, the combination of cup-shaped jaws, means for operating said jaws, and a stop separate from the jaws, extending into the cup shaped space presented by said jaws and arranged transversely thereof for determining the point in the length of the cutting edges at which the cutting action shall take place; substantially as described.

2. In a fruit clipper, the combination of a pair of jaws having cutters with concave faces, means for bringing said cutters into contact at their edges, and a resilient stop member engaging the concave faces of said cutters; substantially as described.

3. In a fruit clipper, the combination of pivoted jaws having cutters with concave faces, means for operating said jaws and a stop member arranged transversely to the cutters and in contact with the concave faces thereof; substantially as described.

4. In a fruit clipper, the combination of a pair of pivoted jaws having cutters with concave faces at one face of the tool, said cutters adapted to meet edge to edge, and a stop member at the aforesaid face of the tool, having a portion directed transversely to the cutters; substantially as described.

5. In a fruit clipper, the combination of a pair of cup shaped pivoted cutters adapted to meet edge to edge, and a transversely arranged stop member yieldingly held in contact with said cutters; substantially as described.

6. In a fruit clipper, the combination of a pair of cutters having concave faces at one face of the tool, a member for pivoting said cutters together, lever handles for operating said cutters, and a stop member for determining the point in the length of the cutting edges at which the cutting action shall take place, supported at one end adjacent said pivot member and having at its opposite end a portion directed transversely to the jaws and in substantial contact with the concave faces thereof; substantially as described.

7. In a hand tool, a pair of lever members pivotally secured together, a spring mounted upon one of said lever members, said spring having a portion positioned to normally react against an element of the hand tool movable relatively to the lever member upon which the spring is mounted for holding said lever members in a definite angular relation to each other, a pivoted cam for forcing said spring out of engagement with the element against which it normally reacts; substantially as described.

8. In a hand tool, the combination of a pair of lever members, a removable pin for pivoting them together, a spring having its opposite ends positioned to react against relatively movable elements of said hand tool for normally separating said lever members, and a pivoted cam upon one of said lever members for forcing said spring out of engagement with one of the elements against which it normally reacts, and thereby facilitating the removal of said pivot member; substantially as described.

9. In a hand tool, a pair of lever members having hollow handle portions and forked forward ends, said forked forward ends provided with registering perforations, a pin to engage said perforations and pivot said members together, means for holding said pin removably in place, a spring for separating the handles, housed in one of the hollow handle portions, and a cam device associated with said hollow handle portion for rendering the spring inoperative; substantially as described.

10. In a hand tool, the combination of a pair of lever members, a removable pivot therefor, one of said lever members having a hollow handle portion, a spring for separating the lever members housed in said hollow handle portion, and a pivoted cam for taking the tension off of said spring; substantially as described.

11. In a hand tool, the combination of lever members having jaws, a stop coöperating with said jaws, said stop having a shank for supporting the stop independently of said jaws and to one side of the same, a removable pivot for said lever members, extending through said shank and lever members for retaining the same in their operating position, and means for retaining said pivot in position.

12. In a hand tool, the combination of a pair of pivoted cutters, a stop coöperating with said cutters, said stop having a shank for supporting the stop independently of said cutters and to one side of the same, a removable pivot extending through said shank and cutters for pivotally securing the cutters together and the shank to the cutters, and a shiftable device engaging said pivot for holding it in place.

In witness whereof, I have hereunto set my hand on the 30th day of October, 1916.

WILLIAM A. BERNARD.

Copies of this patent may be obtained for five cents each, by addressing the "Commissioner of Patents, Washington, D. C."